United States Patent [19]
Fathauer et al.

[11] 3,895,384
[45] July 15, 1975

[54] DISTANCE MEASURING APPARATUS

[75] Inventors: George H. Fathauer, Decatur; Wesley J. Bachman, Mount Zion, both of Ill.

[73] Assignee: Dickey-john Corporation, Auburn, Ill.

[22] Filed: Apr. 23, 1973

[21] Appl. No.: 353,571

[52] U.S. Cl. ............................................. 343/9
[51] Int. Cl. .......................................... G01s 9/46
[58] Field of Search ................................ 343/8, 9

[56] References Cited
UNITED STATES PATENTS

| | | | |
|---|---|---|---|
| 2,732,566 | 5/1973 | Schubring | 343/8 X |
| 2,949,603 | 8/1960 | Logue | 343/9 |
| 3,094,693 | 6/1963 | Taylor | 343/8 X |
| 3,274,535 | 9/1966 | Turner | 343/8 X |

Primary Examiner—T. H. Tubbesing
Attorney, Agent, or Firm—Olson, Trexler, Wolters, Bushnell & Fosse, Ltd.

[57] ABSTRACT

The embodiment of the invention disclosed herein is directed to distance measuring apparatus which includes a directive antenna mounted to a vehicle for directing RF energy toward the surface over which the vehicle is moving. Reflected portions of the RF energy signals are received by the antenna and are mixed in an oscillator-mixer circuit for producing Doppler signals having a repetition rate proportional to the rate of travel of the vehicle. A preamplifier having substantially zero input impedance is connected to the output of the oscillator-mixer circuit. Each Doppler cycle so generated represents a predetermined distance traveled and is delivered to a counter to indicate that distance. The Doppler signal is processed to produce time rate information corresponding to the miles per hour of the vehicle.

8 Claims, 4 Drawing Figures

PATENTED JUL 15 1975　　　　　　　　　　　　3,895,384

SHEET 1

3,895,384

DISTANCE MEASURING APPARATUS

BACKGROUND OF THE INVENTION

This invention relates generally to distance measuring apparatus, and more particularly to distance measuring apparatus which gives an indication of the actual cummulative distance traveled as well as the rate of travel.

Distance measuring apparatus such as that used in over the road vehicles to give an indication of the distance traveled as well as the rate of travel is well known in the art. Wheeled vehicles which have a high coefficient of resistance between the driving wheels and the surface over which the vehicle travels have little or no slippage between the driving wheels and the surface. Therefore, conventional mechanical rotating cables can be coupled to a gearing mechanism associated with the wheels to rotate a mechanical distance measuring indicator in the desired direction. Also associated with the rotating cable is means to indicate the rate of travel of the vehicle in miles per hour. While this type of distance measuring apparatus is generally suitable for vehicles having little or no slippage between the driving wheels and the surface over which they are propelled, mechanical means generally are insufficient for use with farm tractors and the like.

Farm tractors, as well as other farm driven machinery, are designed to move at a relatively slow rate but to haul tremendous loads under all kinds of conditions. The gear reduction between a tractor motor and the large rear drive wheels is substantial and the coefficient of resistance between the tractor wheels and the earth is less than it is over a paved road surface. Therefore, stalling or slowing conditions of this tractor motor do not exist when the driven wheels engage soft or wet earth but rather the wheels slip and continue to rotate at the same speed. Because of the slippage between the tractor wheels and the earths surface a mechanical distance measuring apparatus is insufficient to give accurate readings of the distance traveled. Also, compaction by the wheels will change the effective diameter of the wheel to give an inaccurate reading.

SUMMARY OF THE INVENTION

Accordingly, it is an object of this invention to provide an improved distance measuring apparatus which indicates only the actual distance of travel of a vehicle over the surface over which it travels without regard to slippage of the drive wheels relative to the surface or compaction of the soil onto the drive wheels.

Another object of this invention is to provide an improved distance measuring apparatus which can give both a distance traveled reading as well as time rate of travel readings.

Briefly, the distance measuring apparatus of this invention incorporates the use of an antenna, which may be any suitable directive antenna known in the art, to direct RF energy toward the surface of the ground over which the vehicle is moving. The angle at which the RF energy is directed toward the ground and received therefrom is selected so that reflected signals back to the antenna will produce a mixing action in an oscillator-mixer circuit to generate a Doppler signal. This angle is preferably about 45°. This angle also tends to average out irregularities of ground contour to provide a more accurate reading. The Doppler signal has a repetition rate proportional to the rate of travel of the vehicle over the ground, and each Doppler cycle so generated represents a predetermined distance traveled. A pair of signals are then developed from the Doppler signal, one signal to indicate the actual distance traveled in an accumulative manner, and the other signal to indicate the rate of travel such as in miles per hour.

Since the signals generated correspond only to the actual movement of the vehicle over the ground, drive wheels slippage relative to the ground surface, or change in effective diameter of the drive wheels is of no consequence and an accurate travel reading is at all times obtained.

Many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
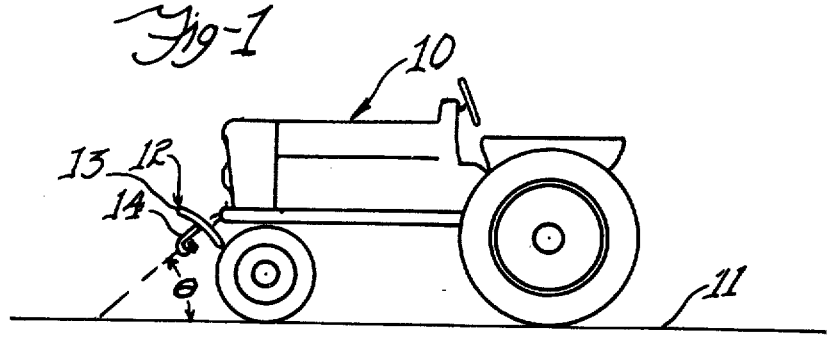
FIG. 1 illustrates a tractor carrying an antenna structure which is used in accordance with the principles of this invention.

Referring now to FIG. 1 there is seen a tractor designated generally by reference numeral 10 and wherein the new and improved distance measuring apparatus of this invention is used. While the distance measuring apparatus of this invention is used most advantageously with farm vehicles, such as tractors, it will be understood that it can be used with other vehicles wherein slippage between the driving wheels and the surface over which it travels is a problem. The tractor 10 moves over a surface 11 and has mounted thereon an antenna assembly 12 which may include a reflector portion 13 and a wave guide or horn portion 14. Other antenna structures may be used as desired. An RF signal is generated within a circuit to energize the antenna 12 and direct the RF signal toward the ground surface at a predetermined angle $\theta$ which is in the order of about 45°. A reflected signal from the ground surface back into the antenna 12 then produces a mixing action so that a Doppler signal is developed.

In accordance with well known Doppler technology, the Doppler frequency in Hertz is equal to two times the velocity of the vehicle divided by the wave length of the frequency being used. For example, a source frequency of 10.525 GHz, which has a wave length of 2.85 cm and an angle $\theta$ between the antenna reflected surface, as shown in FIG. 1, will produce a Doppler frequency of 31.37 Cosine $\theta$ Hz. This is the number of Doppler modulations produced for each mile per hour of travel by the tractor. Therefore, the frequency of the Doppler signal is proportional to the speed of the vehicle and can be read out as miles per hour or any other speed relationship. Also, the number of pulses can be accumulated and the total number of cycles counted for giving a reading of the actual accumulated distance traveled over the surface.

With the antenna at an angle as shown, the distance traveled is equal to the wave length of the RF frequency divided by two times the cosine of the angle $\theta$ times the number of Doppler cycles generated. If it is desired to obtain the distance traveled in inches a multiplication factor of 0.561 is used. Therefore, the distance in inches is equal to 0.561 times the cosine of the angle $\theta$ times the number of Doppler cycles generated. The present invention discloses circuitry which can be used to drive an antenna and to process the Doppler signal generated thereby for reading speed on a meter and for detecting the distance traveled over the ground. Preferably, the microwave source used in accordance with this invention is a solid state Gunn diode oscillator operating at a frequency of 10.525 Ghz. The impedance of the Gunn diode oscillator and the current into the diode is effected by the microwave energy coming back into the antenna results in a current component which varies with the Doppler frequency in accordance with the above formulas.

Figure 2:
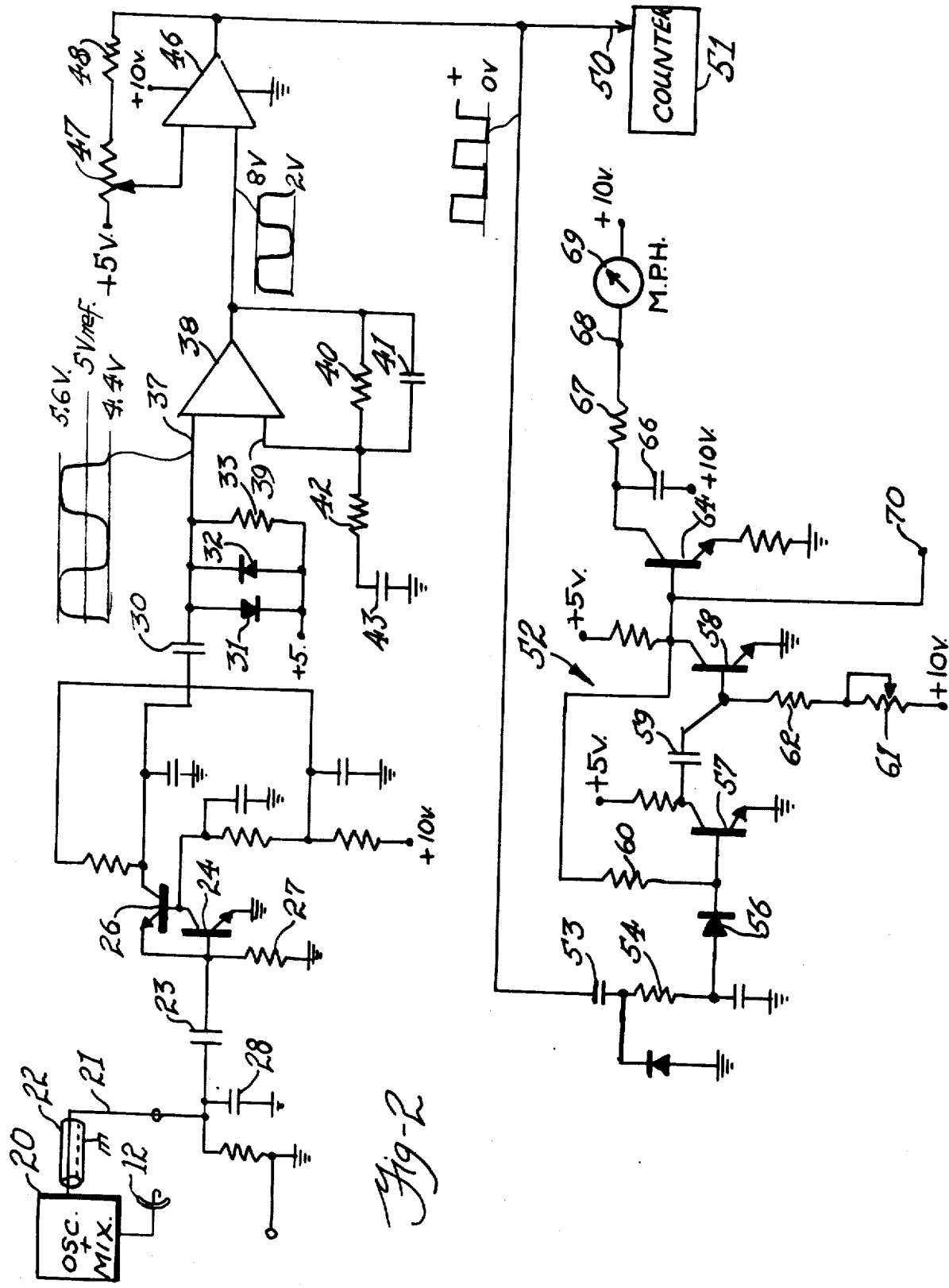
FIG. 2 is a detailed schematic diagram of the circuit for developing a Doppler signal to generate output pulses necessary for cummulative distance measurement and for time rate distance measurement.

Referring now to FIG. 2 the schematic diagram of this invention illustrates generally a Gunn oscillator circuit designated by reference numeral 20 which delivers the Doppler signal along a line 21 of a coaxial cable 22. In accordance with a novel concept of this invention the Doppler signal is delivered through a relatively large coupling capacitor 23 to the base input of a pair of amplifier transistors 24 and 26. The base electrode of transistor 24 is coupled to the emitter electrode of transistor 26 and to a signal developing resistor 27 which, in turn, is connected to ground potential. Most advantageously the transistors 24 and 26 and their associated components are arranged to have substantially zero input impedance. This, therefore, provides a simple, low cost and efficient means for coupling the output of a Gunn diode oscillator to a simple integrated solid state circuit.

A filter capacitor 28 is coupled between the input line 21 and ground so that extraneous high frequency transients can be cancelled. As mentioned above, transistors 24 and 26 form an amplifier stage of extremely low input impedance so that the AC component of the Gunn diode oscillator circuit 20 easily flows into the amplifier thus resulting in a large signal gain at the output of the amplifier without the need of expensive components or circuitry.

Figure 3:
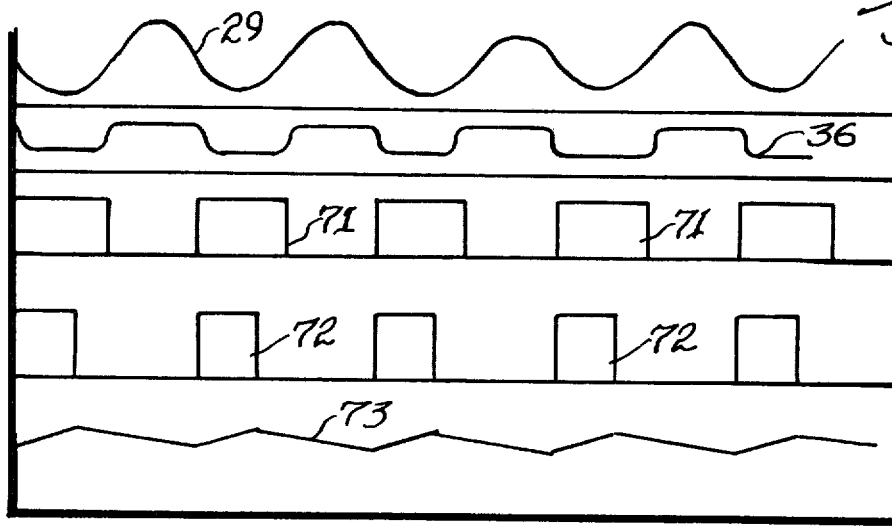
FIG. 3 shows the waveforms of the circuit of FIG. 2.

Because of the beam-width of the antenna structure utilized with this invention, there are a multiplicity of Doppler frequencies distributed about a theoretical center frequency resulting in an amplitude modulation of the desired Doppler signal. This is best illustrated in FIG. 3, which shows the signals 29 which respresents the output signals from the amplifier transistors 24 and 26. The output of the low input impedance amplifier is coupled through a capacitor 30 to be developed across a pair of back-to-back diodes 31 and 32 which are shunted by a high value resistance element 33. The capacitor 30 allows DC restoration of the signal, which is maintained at about the 5 volt reference of the diodes 31 and 32, as shown on the drawings. The back-to-back diodes 31 and 32 clip the signals developed by the amplifier stages and variations in the average reflected energy are clamped at a level which allows a maximum portion of the Doppler signals to be recovered and utilized by the following amplifier stages. The output of the back-to-back diodes is illustrated in FIG. 3 by the signals 36, and are delivered to the input terminal 37 of an operational amplifier 38.

The operational amplifier 38 has the output terminal thereof coupled to a second input 39 via a fixed resistance element 40 and a capacitor 41. The output signal may vary between two and eight volts. Also connected to the second input terminal 39 is a series network comprising a resistor 42 and a capacitor 43. The output of the operational amplifier 38 is connected to the negative input of a second operational amplifier 46 which functions as a Schmidt trigger circuit. An input of the Schmidt trigger is connected to a potentiometer 47 which, in turn, is connected to a fixed resistor 48 coupled back to the output thereof. The Schmidt trigger circuit produces abrupt excersions of the ouput signal between the Schmidt saturation limits as is well known in the art. The dead-band of the Schmidt trigger ignores low amplitude noise signals which might otherwise cause false count pulses to be generated and applied to the output terminal 50. Therefore, only a single output pulse is produced for each sine wave input signal. Output terminal 50 is connected to any suitable counter device 51 which can be used to indicate the accumulated distance of travel of the tractor 10. The output of the Schmidt trigger circuit is also delivered to a one-shot multivibrator 52, this signal being coupled thereto through a capacitor 53, a resistor 54 and a series connected diode 56.

The one-shot multivibrator 52 comprises a pair of transistors 57 and 58, which are coupled together by a capacitor 59 connected between the collector of transistor 57 and the base of transistor 58, and crosscoupled between the collector of transistor 58 and the base of transistor 57 by a resistor 60. Adjustments of the period of operation of the one-shot multivibrator are obtained by potentiometer 61 connected in series with a resistance element 62 to apply operating bias to the circuit. The output of the one-shot generates pulses of equal width which are then integrated by a transistor 64 and a capacitor 66 and resistor 67. This integrated signal is applied to terminal 68 which, in turn, is connected to a direct meter readout device 69 to indicate the rate of travel, this preferably being in miles per hour or the like. A nonintegrated clock pulse is applied to a terminal 70 and can be used for other circuits as desired.

Output signals from the Schmidt trigger are indicated by reference numerals 71 of FIG. 3. These signals are differentiated to trigger the one-shot multivibrator circuit to produce a waveform 72 which is applied to the base electrode of the transistors 64. Transistor 64 then integrates the signal as indicated by the waveforms 73 to produce an average meter reading through the milliameter 69. The average DC level of the waveform 73 is determined by the average DC component of the square waves 72.

Figure 4:
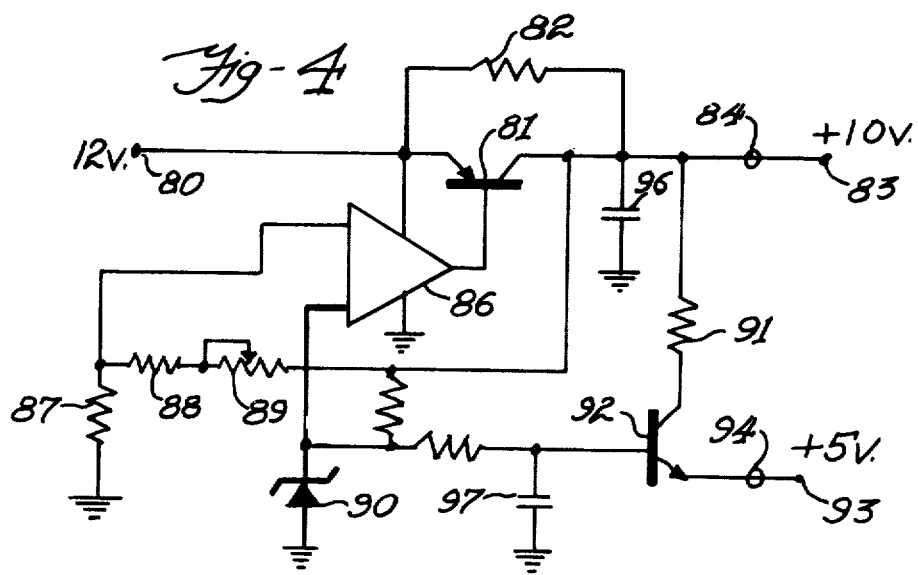
FIG. 4 is a schematic diagram of a power supply which can be used to operate the circuit of FIG. 2.

Referring now to FIG. 4 there is seen a schematic diagram of the power supply circuit which can be utilized in accordance with the principles of this invention. Here an input terminal 80 is arranged for connection to a 12 volt source such as the battery of the tractor or other vehicle. This 12 volt source is then controlled through a transistor 81 which is shunted by a fixed resistance element 82 which provides a minimum current path to an output terminal 83. The output terminal 83 passes through a chassis feed through capacitor 84 and supplies a regulated 10 volt source to the various 10 volt circuit points of FIG. 2. To control the operation of the power transistor 81 an operational amplifier 86 is connected to the base emitter junction thereof, this operational amplifier having the two inputs thereof connected to a variable impedance network comprising a pair of fixed resistance elements 87 and 88 and a variable resistance element 89. Voltage regulation is obtained by a Zener diode 90 connected to the input of the operational amplifier 86. A voltage dropping network comprises a resistor 91 and a series connected transistor 92 which connects to a second output terminal 93. The output terminal 93 passes through a coupling feed through capacitor 94. The terminal 93 supplies regulated 5 volts to the various 5 volt connections of FIG. 2. Transient suppression is obtained by strategically locating a plurality of capacitors such as capacitors 96 and 97. While the power supply of FIG. 4 is shown in the illustrated embodiment it will be understood that other suitable power supply circuits may be used as desired.

The distance measuring apparatus of this invention is used to direct and receive signals from a ground surface that is relatively closely spaced from the antenna. For example, when using the apparatus on a farm tractor as disclosed herein the actual distance between the radiating antenna and the ground surface may be in the order of about 3' or so. Despite this relatively close range between the antenna and the inpinging surface the circuit of this invention provides very accurate indications of distance and rate of travel.

Accordingly, many other modifications and variations of this invention may be effected without departing from the spirit and scope of the novel concepts disclosed and claimed herein.

The invention is claimed as follows:

1. A distance measuring apparatus for vehicles, comprising: antenna means to be mounted to a vehicle for directing RF energy towards the surface over which the vehicle is moving and for receiving reflected signals of said RF energy from the surface, oscillator-mixer means for generating said RF energy and for mixing therewith the reflected portions of said RF energy to produce a Doppler signal which has a component proportional to the rate of travel of the vehicle over the surface, said Doppler signal so generated representing predetermined increments of distances traveled, a low input impedance amplifier circuit having the input thereof connected to said oscillator-mixer means to receive said Doppler signal, said low input impedance amplifier circuit comprising a pair of transistors, one of said transistors having a grounded emitter with its base coupled to said oscillator-mixer means, the other transistor having the base thereof connected to the collector of said one transistor and the emitter thereof connected to the base of said one transistor, circuit means for developing said amplifier Doppler signal and translating the same to output terminal means, and indicator readout means connected to said output terminal means for receiving said Doppler signal to produce a visual reading of the distance traveled.

2. The distance measuring apparatus for vehicles according to claim 1, wherein said indicator readout means is a counter to show the accumulative distance traveled.

3. The distance measuring apparatus for vehicles according to claim 1, wherein said indicator readout means is a speedometer to show the time rate of measurement of the distance traveled.

4. The distance measuring apparatus for vehicles according to claim 3, wherein the said time rate measurement is in miles per hour.

5. The distance measuring apparatus for vehicles according to claim 1, wherein said circuit means for developing said amplified Doppler signal include a multivibrator circuit, an integrating circuit connected thereto, and a milliameter connected to said integrating circuit to produce a current reading which is calibrated and indicative of the time rate of travel of the vehicle, and further including a trigger circuit also for receiving said amplified Doppler signal to produce a count pulse at an output terminal for energizing a counter to produce an accumulative indication of the distance traveled.

6. The distance measuring apparatus for vehicles according to claim 1, wherein said antenna means is arranged for connection to a vehicle to be at all times relatively close to the ground surface over which the vehicle is moving.

7. The distance measuring apparatus for vehicles according to claim 1, further including clamp circuit means coupled between said low input impedance amplifier circuit and said circuit means to maintain said Doppler signal within a predetermined voltage range.

8. The distance measuring apparatus for vehicles according to claim 7, wherein said clamp circuit means includes a pair of parallel connected back-to-back diodes, a series connected capacitor connected between said low input impedance amplifier circuit and one end of said diodes, the other end of said diodes being connected to a source of DC voltage, whereby the variation of said Doppler signal is limited by the inherent voltage drop across said diodes above and below the value of said DC voltage source.

* * * * *